United States Patent Office 3,492,591
Patented Jan. 27, 1970

3,492,591
SIGNAL DETECTOR
Arthur Shapiro, West Orange, N.J., assignor to Bell Telephone Laboratories, Incorporated, Murray Hill, N.J., a corporation of New York
Filed Apr. 26, 1967, Ser. No. 633,839
Int. Cl. H03b 1/04; H03k 17/30
U.S. Cl. 328—167                              9 Claims

ABSTRACT OF THE DISCLOSURE

Narrowband signals hidden in noise are detected with no prior knowledge of the statistical properties of the signals or the noise. Estimates of the power spectrums of signals received on two receiving units are combined in three subdetectors with the weighted estimates of the cospectrum and quadrature spectrum of the received signals. An information bearing signal is considered present when the output signal of any one subdetector exceeds a corresponding selected threshold value.

BACKGROUND OF THE INVENTION

This invention relates to signal detection and, in particular, to the detection of narrowband signals in noise.

Often, in such fields as acoustic signal detection and seismic wave detection, it is necessary to detect narrowband signals in noise. The optimal processor for detecting certain types of signals in Gaussian noise requires knowledge of selected statistical properties of both the signal and the noise before the detector can be implemented. This is discussed by Bryn in an article entitled "Optimum Signal Processing of Three-Dimensional Arrays Operating on Gaussian Signals and Noise" in the Journal of the Acoustical Society of America, vol. 34, pages 289–297, 1962.

Unfortunately, the statistical properties of the signal and noise are not usually known. Thus, in practice the optimal detector is difficult, if not imposible, to implement. As a result, the so-called standard detector, which employs uniform weighting as a function of frequency of the signals from all the receiving units, together with linear delays, is used.

Much effort has been spent trying to develop a detector with a performance approaching that of the optimal detector.

Summary of the invention

This invention, the result of one such effort, significantly improves the probabilities of detecting a narrowband signal in noise over the probabilities associated with prior art systems of the type using two receiving units. No prior knowledge of the characteristics of the signal or the noise is required other than that the signals are narrowband. Nevertheless, when both the signal and noise are Gaussian, the performance of the resulting detector is, in most cases, somewhat better than the performance of the standard detector. When the noise is coherent, its performance approaches the performance of the optimal detector.

The detector of this invention overcomes the limitations of the prior art detectors by employing three subdetectors, each operating in a different way on "estimates" of the spectrums derived from the signals received at the two receiving units. One subdetector produces an output signal proportional to the sum of the estimates of the power spectrums of the signals received at the two receiving units, plus the weighted estimate of the real part of the cross spectrum of the the two received signals, the so-called cospectrum.

The second subdetector produces an output signal proportional to the weighted sum of the estimates of the power spectrums of the two received signals, plus the weighted estimate of the cospectrum of the two received signals, plus the estimate of the imaginary part of the cross spectrum of the two received signals, the so-called quadrature spectrum.

The third subdetector produces an output signal identical to that of the second subdetector except the estimate of the quadrature spectrum of the two received signals is subtracted rather than added to the other spectral estimates.

A signal is considered present when the output signal from any one of the subdetectors exceeds a corresponding selected threshold value.

The resulting system yields a significant improvement in the ability to detect narowband signals in coherent noise without, surprisingly, a corresponding increase in system complexity.

Further, the principles of this invention can be implemented in either an analog or a digital manner.

This invention may be more fully understood from the following description taken together with the attached drawings.

Detailed description

Figure 1:
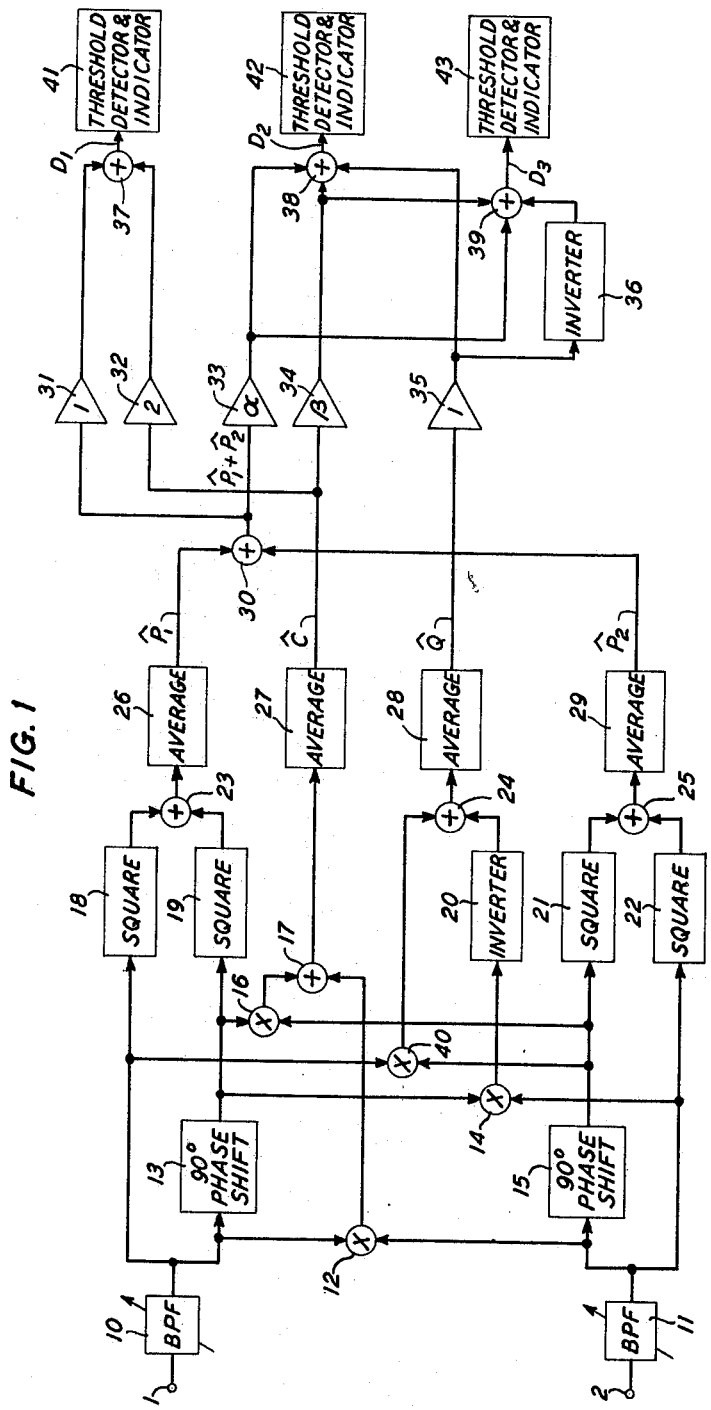
FIG. 1 is a schematic block diagram of an analog detector using the principles of this invention.

Before describing an embodiment of this invention, certain characteristics of narrowband signals will be described. A narrowband signal is by definition a signal whose bandwidth is small relative to the carrier frequency. Such a signal can, for example, be written mathematically as $$f(t) = X(t) \cos(\omega t + \varphi) \qquad (1)$$

Here, $f(t)$ is the narrowband signal, $X(t)$ is the envelope of the narrowband signal (in general a time dependent function with a bandwidth small compared to the carrier frequency), $\omega$ is the carrier frequency of $f(t)$, $t$ is time, and $\varphi$ is the initial phase of the carrier of $f(t)$.

The frequency spectrum of $f(t)$ is defined as $$F(\omega) = \int_{-\infty}^{\infty} f(t) e^{-j\omega t} dt \qquad (2)$$

$$= R(\omega) + jI(\omega) \qquad (3a)$$

$$= A(\omega) e^{j\varphi(\omega)} \qquad (3b)$$

In Equations 3a and 3b, $R(\omega)$ and $I(\omega)$ are the real and imaginary parts respectively of $F(\omega)$, $A(\omega)$, equal to $|\sqrt{R^2+I^2}|$, represents the amplitude spectrum of $f(t)$, $\varphi(\omega)$, equal to $\tan^{-1} I/R$, is the phase spectrum of $f(t)$, and $\omega$ represents radian frequency. The power spectrum of $f(t)$ is defined as $A^2(\omega)$. A comparison of Equations 3a and 3b shows that $$R(\omega) = A(\omega) \cos \varphi(\omega) \qquad (4a)$$

and $$I(\omega) = A(\omega) \sin \varphi(\omega) \qquad (4b)$$

Use will be made of these last two equations later.

The frequency spectrum, as defined in Equation 2, requires knowledge of $f(t)$ over all time, from $-\infty$ to $+\infty$. This knowledge is, of course, impossible to obtain. Usually $f(t)$ is known only over a rather limited time. Hence, one speaks of the "spectral estimate" of a signal, which is merely the best estimate one can make, in a statistical sense, of the spectrum of the signal, based on the information available about the signal.

When the term "spectral estimate" is used hereafter in this specification, it refers to either the estimate of the power spectrum of a signal, or as will be apparent from its context, to the estimate of the cross spectrum of two signals.

As the bandwidth of a narrowband signal becomes smaller, the amplitude spectrum $A(\omega)$ of the narrowband signal approaches a line spectrum. In the limiting case, when the narrowband signal $f(t)$ contains only a pure sinusoid, its envelope $X(t)$ becomes a constant X, and its one sided amplitude spectrum $A(\omega)$ is equal to X at the frequency of the sinusoid, and to zero at all other frequencies.

To determine the amplitude of the envelope X of the narrowband signal in this idealized situation, two samples of the narrowband signal, the second taken one-quarter the carrier period after the first, are needed. The need for two samples reflects the fact that, in general, both the phase and the instantaneous amplitude of the narrowband signal are unknown. One way of generating these two samples is to produce two versions of the narrowband signal, one delayed by one-quarter the carrier period relative to the other. The undelayed version of the narrowband signal $f(t)$ is defined as in Equation 1. The delayed version of $f(t)$ is written as $$f'(t) = X(t) \sin(\omega t + \varphi) \qquad (5)$$

A signal proportional to the instantaneous amplitude of the power spectrum P of $f(t)$ is obtained merely by taking the sum of the squares of $f(t)$ and $f'(t)$. Because in the idealized situation, the envelope $X(t)$ is a constant X, the power spectrum P can be determined merely by summing the squares of simultaneously obtained samples of $f(t)$ and $f'(t)$. When this is done, it is found that $P=X^2$.

In the case where the envelope is dependent on time, the magnitude of the power spectrum $P(\omega) = A^2(\omega)$ will depend on the time at which it is measured. To obtain an estimate of the average value of the power spectrum of a signal, one must obtain many samples of the magnitude of the amplitude spectrum and average the squared values of these samples. This is done in this invention to obtain continuous estimates of the magnitudes of the power spectrums of the signals received on each of two receiving units.

In addition to using estimates of the power spectrums of two received signals, this invention also uses estimates of the cross spectrum of the two signals. The cross spectrum is defined as the Fourier transform of the cross correlation function of the signals received at the two receiving units. The concept of the cross spectrum is discussed in detail in "Random Processes in Automatic Control" by Laning and Battin, McGraw-Hill, 1956, on pages 132–136, and thus will not be discussed here. It is sufficient here merely to point out that the cross spectrum of two signals is, in general, composed of a real part C, called the cospectrum, and an imaginary part Q, called the quadrature spectrum.

The cospectrum of the two received signals is defined in terms of the real and imaginary parts, R and I, of the frequency spectrums of the two received signals as $$C = R_1 R_2 + I_1 I_2 \qquad (6)$$

The quadrature spectrum of these two received signals is similarly defined as $$Q = R_1 I_2 - I_1 R_2 \qquad (7)$$

Subscripts 1 and 2 denote that a function has been derived from, or is related to, the signals received at the first and second receiving units respectively.

Rather than calculate the real and imaginary parts of the frequency spectrums of the signals received at the first and second receiving units and then use these parts to obtain the cospectrum and quadrature spectrum of the two received signals, this invention obtains the cospectrum C and the quadrature spectrum Q directly from the two received narrowband signals.

If $f_1(t)$ and $f_1'(t)$ are the undelayed and delayed versions of the signal received at the first receiving unit, and if $f_2(t)$ and $f_2'(t)$ are the undelayed and delayed versions of the signal received at the second receiving unit, then it can be shown that $$C(t) = f_1(t)f_2(t) + f_1'(t)f_2'(t) \qquad (8)$$

and $$Q(t) = f_1(t)f_2'(t) - f_1'(t)f_2(t) \qquad (9)$$

$C(t)$ and $Q(t)$ represent the instantaneous values of the cospectrum and quadrature spectrum of the two received signals.

A substitution of Equations 1 and 5 with subscripts 1 and 2 to denote the signals received at the first and second transducers respectively, into Equations 8 and 9, shows that $$C(t) = X_1(t) X_2(t) \cos(\varphi_1 - \varphi_2) \qquad (10)$$

and $$Q(t) = -X_1(t) X_2(t) \sin(\varphi - \varphi_2) \qquad (11)$$

These are precisely the values obtained by substituting Equations 4a and 4b, with appropriate subscripts, into Equations 6 and 7, for the case where the narrowband signal is a pure sinusoid. Hence, Equations 8 and 9 are equivalent to Equations 6 and 7 when the narrowband signal is a pure sinusoid.

In practice, of course, narrowband signals are usually not pure sinusoids. But useful estimates of the cospectrum and quadrature spectrum of two received narrowband signals can be obtained by averaging signals derived as shown in Equations 8 and 9.

Embodiment of FIG. 1

In FIG. 1 two transducers 1 and 2, of any well known design, generate electrical waveforms representing received signals. T waveform generated by each transducer is passed through a corresponding one of bandpass filters 10 and 11, to remove the noise frequency components outside the range of frequencies occupied by the exposed narrowband signal. Bandpass filters 10 and 11 have variable center frequencies and narrow bandwidths. The variable center frequencies allow these filters to be adjusted to pass a broad range of expected narrowband signals.

Upon leaving filters 10 and 11, each filtered waveform is sent along two paths. The waveform from filter 10, represented analytically as $f_1(t)$, is transmitted to network 18 where it is squared. This waveform is also transmitted through 90° phase shifter 13 to generate a second signal represented analytically as $f_1'(t)$. Phase shifter 13 is either a broadband Hilbert transformer or a differentiating network. If it is a Hilbert transformer, compensating delays must be placed throughout the system, at places obvious to one skilled in the signal processing arts, to synchronize the signals being processed. The signal from phase shifter 13 is then transmitted to network 19 where it is squared.

The signals from networks 18 and 19 are added in summing network 23 and then passed through averaging network 26 to produce an output signal $\hat{P}_1$ proportional to the average magnitude or "estimate" of the power spectrum $P_1$ of the signal received by transducer 1.

Similarly, the output waveform $f_2(t)$ from filter 11, is squared in network 22 and simultaneously is shifted in phase 90° by network 15. Network 15 again is either a broadband Hilbert transformer or a differentiating network. The output waveform $f_2'(t)$ from network 15 is squared in network 21 and added in network 25 to the signal from squaring network 22. Averaging network 29 filters the sum signal from network 25 to produce an output signal proportional to the estimated power spectrum $P_2$ of the signal detected at transducer 2.

The signals $$\hat{P}_1 \text{ and } \hat{P}_2$$

representing the estimated power spectrums of the two received signals are added in network 30 to produce a signal proportional to their sum.

The waveforms from filters 10 and 11 are also used to generate estimates of the cospectrum and the quadrature spectrum of the two received signals. Thus, as required by Equation 8, multiplying network 12 forms the product signal $f_1(t)f_2(t)$. Multiplying network 16 forms, as shown, the product signal $f_1'(t)f_2'(t)$. Summing network 17 adds these two products to produce an output signal proportional to the instantaneous value of the cospectrum of the two received signals. And, averaging network 27 produces a signal $\hat{C}$ proportional to the estimate of the expected value of this cospectrum.

Similarly, as required by Equation 9, multiplying network 40 forms the product signal $f_1(t)f_2'(t)$ and multiplying network 14 produces the product signal $f_1'(t)f_2(t)$. This latter signal is inverted in phase by inverter 20 and then added in network 24 to the output signal from multiplier 40 to produce a signal proportional to the instantaneous value of the quadrature spectrum of the two received signals. Averaging network 28 produces an output signal $\hat{Q}$ which represents the estimate of the average value of the quadrature spectrum over a selected time.

The spectral estimates $$\hat{P}_1, \hat{P}_2, \hat{C}, \text{ and } \hat{Q}$$

are now combined in thre different ways, after being appropriately weighted, to produce three output signals. When any one of these output signals exceeds a corresponding threshold value, an information bearing signal will be considered as having been received by transducers 1 and 2.

The first subdetector produces an output signal $D_1$ representing the sum $$\hat{P}_1 + \hat{P}_2 + 2\hat{C}$$

This detector works best when the phase difference between the noise detected by transducers 1 and 2 is near zero or $\pi$. Amplifiers 31 and 32 appropriately weight the spectral estimates $\hat{P}_1$ and $\hat{P}_2$ and $\hat{C}$ respectively. Network 37 combines these weighted spectrums to produce the output signal $D_1$.

The second subdetector produces an output signal $D_2$ representing the sum $$\alpha(\hat{P}_1 + \hat{P}_2) + \beta\hat{C} + \hat{Q}$$

where $\alpha$ and $\beta$ are selected constants. Typical values of $\alpha$ and $\beta$ might be approximately 0.9 and 1.5, respectively. Other values of $\alpha$ and $\beta$, within a selected range of 0.9 and 1.5, can be used if desired. Thus, amplifiers 33, 34, and 35 appropriately weight $$\hat{P}_1 + \hat{P}_2, \hat{C}, \text{ and } \hat{Q}$$

while network 38 combines these weighted spectrums to produce output signal $D_2$.

The next subdetector produces an output signal $D_3$ proportional to $$\alpha(\hat{P}_1 + \hat{P}_2) + \beta\hat{C} - \hat{Q}$$

Inverter 36 reverses the polarity of the weighted quadrature signal from amplifier 35. Network 39 sums the signals from amplifiers 33, 34 and inverter 36 to produce output signal $D_3$.

Output signals $D_2$ and $D_3$ are most useful in detecting the receipt of information bearing signals when the phase difference between the noise at the two transducers is near $$-\frac{\pi}{2} \text{ or } \frac{\pi}{2}$$

respectively.

Combined threshold detectors and indicators 41, 42 and 43 process signals $D_1$, $D_2$ and $D_3$, respectively, and indicate when any of these output signals exceeds a corresponding threshold. Such devices are well known in the signal processing arts and thus will not be described in detail. The threshold levels appropriate for use in these detectors can be determined either empirically or theoretically and are functions of such variables as detection time, false alarm probability (that is, the probability of indicating an information bearing signal has been received when no such signal is present), signal to noise ratio, and noise coherence.

Figure 2:
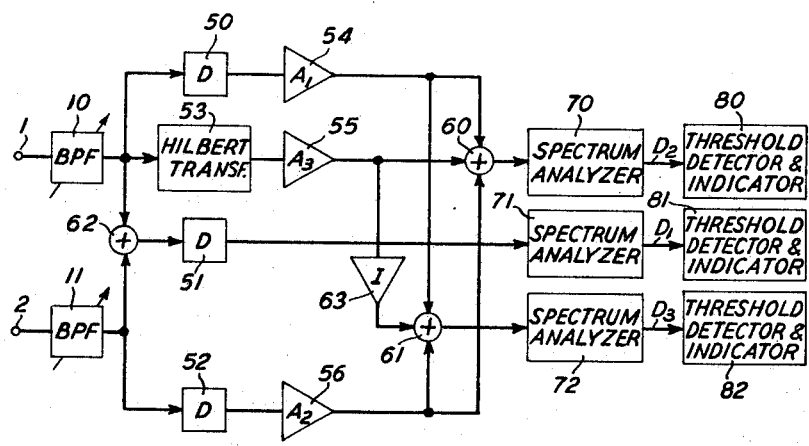
FIG. 2 is a schematic block diagram of an alternative embodiment of this invention.

Embodiment of FIG. 2

FIG. 2 shows an alternative embodiment of this invention. FIG. 2 is based on the realization that the signal $D_2$ is the estimate of the power spectrum of the signal $A_1f_1(t) + A_2f_2(t) + A_3f_1'(t)$, that the signal $D_3$ is the estimate of the power spectrum of the signal $$A_1f_1(t) + A_2f_2(t) - A_3f_1'(t)$$

and finally, that the signal $D_1$ is the estimate of the power spectrum of $f_1(t) + f_2(t)$. The terms $A_1$, $A_2$ and $A_3$ are defined as $$A_1 = (1-x)/\sqrt{1+x} \quad (12)$$

$$A_2 = \sqrt{1+x} \quad (13)$$

$$A_3 = 2\sqrt{x}/\sqrt{1+x} \quad (14)$$

where $x$ can vary between 0 and 1.

Thus, in FIG. 2, the signals detected at transducers 1 and 2 are filtered, as in FIG. 1, by bandpass filters 10 and 11. The signal from filter 10 is passed through Hilbert transformer 53 to produce the signal $f_1'(t)$ containing the same frequencey components as $f_1(t)$ shifted in phase by 90°. Simultaneously, the signal from filter 10 is delayed in network 50 to synchronize it with the output signal from transformer 53. The signals from network 50 and transformer 53 are weighted in amplifiers 54 and 55 by the amounts $A_1$ and $A_3$, respectively, and then summed in network 60 with $A_2f_2(t)$, from amplifier 56.

The output signal from network 60 is processed in spectrum analyzer 70 to yield $D_2$, an estimate of the power spectrum of $A_1f_1(t) + A_2f_2(t) + A_3f_1'(t)$. Spectrum analyzers of this type are well known in the signal processing arts and thus this analyzer will not be described in detail.

Similarly, the signal $f_2(t)$ detected by transducer 2 is filtered in bandpass filter 11. The signal from filter 11 is then passed through delay 52 to synchronize it with the output signal from transformer 53 and weighted in amplifier 56 by the amount $A_2$. Then this weighted signal is combined in summing network 61 with the signals $A_1f_1(t)$ and $-A_3f_1'(t)$. The signal $-A_3f_1'(t)$ is obtained by passing the output signal from amplifier 55 through phase inverter 63.

The output signal from network 61 is processed in spectrum analyzer 72 to yield the signal $D_3$, an estimate of the power spectrum of $A_1f_1(t) + A_2f_2(t) - A_3f_1'(t)$.

Finally, the output signals from filters 10 and 11 are combined in network 62. The sum signal from network 62 is delayed in network 51 to synchronize it with the output signal from transformer 53 and then is processed in spectrum analyzer 71 to yield the signal $D_1$, an estimate of the power spectrum of the signal $f_1(t) + f_2(t)$.

Threshold detectors and indicators 80, 81 and 82, as before, indicate when the signals $D_2$, $D_1$ or $D_3$ exceed selected corresponding thresholds.

Figure 3:
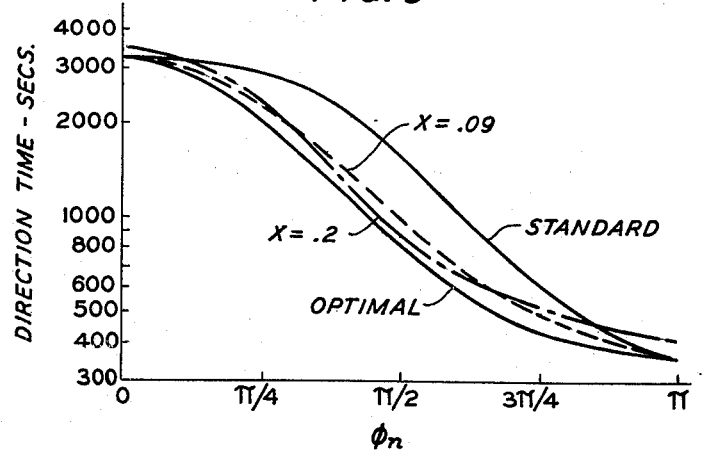
FIG. 3 is a graph showing the performance of a detector constructed according to the principles of this invention relative to the performance of the standard and an optimal detector.

Discussion of FIG. 3

FIG. 3 shows the detection time for an information bearing signal possessing a signal to noise ratio of 0.05. The probability of detection is .5, the false alarm probability is .001 and the noise coherence or correlation is .5. The abscissa represents the phase difference between the noise at the two transducers 1 and 2 (FIG. 1). The top curve represents the performance of the standard detector. The bottom curve represents the performance of an optimal detector. The two curves in between, shown as dashed lines, represent the performance of the detector of this invention for two values of the parameter $x$. This parameter is related to the constants $\alpha$ and $\beta$ by the relations $$\alpha = \frac{(1+x)}{4\sqrt{x}} \qquad (15)$$

and $$\beta = \frac{2(1-x)}{4\sqrt{x}} \qquad (16)$$

An examination of these curves shows that as the value of $x$ increases, the performance of the detector of this invention approaches that of the optimum detector for a phase difference between the noise at the two transducers of 90°. For phase differences between the noise at the two transducers of 0° or 180°, the detector of this invention is slightly poorer in performance than the standard detector. But as $x$ is decreased in magnitude, thereby changing $\alpha$ and $\beta$, the performance of the detector of this invention approaches that of the standard detector for these values of noise phase difference. For most values of noise phase difference and the parameter $x$, the detector of this invention is seen to yield a significant improvemt in detection time over the standard detector.

While two analog embodiments of this invention have been described, other analog embodiments will be obvious in light of this disclosure. In addition, the method taught by this invention can equally well be carried out digitally. In light of this disclosure, the digital implementation of this method will be obvious to those skilled in the signal processing arts.

What is claimed is:

1. Apparatus which comprises
    means for generating two electrical waveforms in response to noise at two spatially separated points,
    means for producing estimates of the cospectrum, the quadrature spectrum, and the power spectrums of said two electrical waveforms,
    means for combining said estimates to produce a plurality of output signals, and
    means for detecting information bearing signals immersed in said noise, said detecting means including means for comparing each of said plurality of output signals to a corresponding threshold level, and means for indicating when any one of said output signals exceeds its corresponding threshold level.

2. Apparatus as in claim 1 in which said means for combining said estimates comprises
    means for producing a first output signal proportional to the sum of said power spectrum estimates plus said cospectrum estimate weighted a first selected amount,
    means for producing a second output signal proportional to the sum of said power spectrum estimates weighted a second selected amount plus said cospectrum estimate weighted a third selected amount, plus said quadrature spectrum estimate, and
    means for producing a third output signal proportional to the sum of said power spectrum estimates weighted said second selected amount plus said cospectrum estimate weighted said third selected amount minus said quadrature spectrum estimate.

3. Apparatus as in claim 2 wherein said first selected amount is two (2).

4. Apparatus as in claim 2 wherein said second selected amount is equal to approximately 0.9.

5. Apparatus as in claim 2 wherein said third selected amount is equal to approximately 1.5.

6. Apparatus which comprises
    two receiving units for producing first and second waveforms in response to noise and, at random intervals, information bearing signals,
    means for producing estimates of the cospectrum, the quadrature spectrum, and the power spectrums of said first and second waveforms, said spectrums being denoted $$\hat{C}, \hat{Q}, \text{ and } \hat{P}_1, \hat{P}_2$$

respectively,
    means for producing a first output signal proportional to $$\hat{P}_1 + \hat{P}_2 + 2\hat{C}$$

means for producing a second output signal proportional to $$\alpha(\hat{P}_1 + \hat{P}_2) + \beta\hat{C} + \hat{Q}$$

where $\alpha$ and $\beta$ are selected constants,
    means for producing a third output signal proportional to $$\alpha(\hat{P}_1 + \hat{P}_2) + \beta\hat{C} - \hat{Q}$$

and
    means for detecting the receipt of said information bearing signals by detecting when said first, second or third output signals exceed selected corresponding thresholds.

7. The method of detecting a narrowband signal immersed in noise which comprises
    producing first and second waveforms representing the energy detected at two spatially separated points,
    producing estimates of the cospectrum, the quadrature spectrum, and the power spectrums of said first and second waveforms, said estimates being denoted as $$\hat{C}, \hat{Q}, \text{ and } \hat{P}_1, \hat{P}_2$$

respectively,
    producing a first output signal proportional to $$\hat{P}_1 + \hat{P}_2 + 2\hat{C}$$

producing a second output signal proportional to $$\alpha(\hat{P}_1 + \hat{P}_2) + \beta\hat{C} + \hat{Q}$$

where $\alpha$ and $\beta$ are selected constants,
    producing a third output signal proportional to $$\alpha(\hat{P}_1 + \hat{P}_2) + \beta\hat{C} - \hat{Q}$$

and
    detecting when said first, second, or third output signals exceed selected corresponding thresholds.

8. Apparatus which comprises
    means for generating two electrical waveforms $f_1(t)$ and $f_2(t)$ in response to noise at two spatially separated points,
    means for generating the Hilbert transform $f_1'(t)$ of $f_1(t)$,
    means for weighting and combining $f_1(t)$, $f_2(t)$, and $f_1'(t)$ to produce the three sum signals $$A_1 f_1(t) + A_2 f_2(t) + A_3 f_1'(t)$$

$A_1 f_1(t) + A_2 f_2(t) - A_3 f_1'(t)$, and $f_1(t) + f_2(t)$, where $A_1$, $A_2$, and $A_3$ are selected constants,
    means for processing said three sum signals to produce estimates of the power spectrums of said three sum signals, and
    means for indicating the receipt of an information bearing signal by detecting when any one of said estimates exceeds a corresponding selected threshold.

9. The method of detecting the receipt of an information bearing narrowband signal immersed in noise which comprises
- generating two electrical waveforms in response to the signals detected at two spatially separated points,
- generating the Hilbert transform of one of said waveforms,
- weighting and combining said two waveforms and said Hilbert transform to produce three selected sum signals,
- processing said three sum signals to produce estimates of the power spectrums of said three sum signals, and
- indicating the receipt of the information bearing signal by detecting when any one of said estimates exceeds a corresponding selected threshold.

References Cited

UNITED STATES PATENTS 3,421,141  1/1969  Meyerhoff _____ 328—67 X

DONALD D. FORRER, Primary Examiner

B. P. DAVIS, Assistant Examiner

U.S. Cl. X.R.

328—149, 165, 166